United States Patent
Burger et al.

[11] 3,802,598
[45] Apr. 9, 1974

[54] REAR CARRIER FOR BICYCLE

[75] Inventors: Irvin E. Burger, Skokee; John Peter Ronvik, Palos Heights; Kenneth F. Welter, Addison, all of Ill.

[73] Assignee: Sears, Roebuck and Co., Chicago, Ill.

[22] Filed: Apr. 14, 1972

[21] Appl. No.: 244,025

[52] U.S. Cl. .............................................. 280/202
[51] Int. Cl. ............................................... B62j 1/28
[58] Field of Search .. 280/202; 297/DIG. 2, DIG. 9, 297/243, 423, 195; 224/30, 31, 32

[56] References Cited
UNITED STATES PATENTS
| | | | |
|---|---|---|---|
| 3,619,003 | 1/1970 | Rich | 297/DIG. 9 X |
| 416,699 | 12/1889 | Whitman | 297/423 |
| 1,093,741 | 4/1914 | Stoll | 280/202 |
| 605,699 | 6/1898 | Cowden | 280/202 |

FOREIGN PATENTS OR APPLICATIONS
| | | | |
|---|---|---|---|
| 457,219 | 11/1936 | Great Britain | 280/202 |

Primary Examiner—David Schonberg
Assistant Examiner—Terrance L. Siemens
Attorney, Agent, or Firm—Arnstein, Gluck, Weitzenfeld & Minow

[57] ABSTRACT

A carrier adapted for carrying a child on the rear portion of a bicycle including a frame having a pair of tubular members, a one-piece seat member and apparatus for mounting the frame on the rear portion of a bicycle and for securing the seat member to the frame. The one-piece seat member is constructed to partially enclose the legs and feet of a seated child and for providing footholds therefor. The tubular members of the frame are mountable by means of a bracket on a bicycle seat post. The tubular members are further attachable at their other ends to struts of the frame of a bicycle. The seat member also has an upwardly extending back support portion for enclosing the lower torso portion of a seated child on three sides.

9 Claims, 10 Drawing Figures

PATENTED APR 9 1974

REAR CARRIER FOR BICYCLE

BACKGROUND OF THE INVENTION

The present invention relates to a carrier for carrying a child on the rear portion of a bicycle.

Carriers for carrying children as a passenger on bicycles are in wide use. However, these carriers do not provide any protection to the legs and feet of the child, particularly protection from the danger of the feet becoming entangled in the wheels or spokes of the bicycle, and are not readily adjustable to permit carrying the child as low and as close to the rider as comfortably possible for optimum stability and safety. In some cases, a measure of protection has been provided by attaching a sheet metal shield or apron to the bicycle frame or to the carrier in the approximate area where the feet might contact the wheel or spokes. Although these devices have provided partial protection for the legs and feet of a child, no protection has been afforded to the feet when placed outside of the area of the spoke guard or guard plate or where the feet of the child have been moved away from contact with the footholds heretofore provided. In addition, the rear carriers heretofore used require mounting on the rear axle of the bicycle. Mounting in this manner has been found to be disadvantageous since mounting and demounting require loosening or removal of the axle nuts requiring realignment of the rear wheel with respect to the bicycle frame and retensioning of the drive chain.

BRIEF SUMMARY OF THE INVENTION

An object of the invention, therefore, is the provision of a rear carrier adapted for carrying a child on a bicycle having means for partially enclosing the legs and feet of a seated child and for providing footholds therefor to protect the legs and feet of the child from contact with the wheel and spokes of the bicycle and to prevent the feet of the child from becoming entangled in the spokes of the rear wheel.

Another object of this invention is the provision of a rear carrier for carrying a child on a bicycle which is mounted on the frame of the bicycle in a plurality of adjusted positions with respect thereto to permit adjustment of carrier and passenger for optimum stability and safety and which does not require loosening or removal of the axle nuts for mounting or demounting of the carrier.

A further object of this invention is the provision of a carrier adapted for carrying a child on a bicycle which is securely mountable on the frame of a bicycle and which provides for partially enclosing the lower portion of the torso of a seated child on three sides and provides for partially enclosing the legs and feet of a seated child and provides footholds therefor.

In accordance with the present invention there is provided a carrier adapted for carrying a child on the rear portion of a bicycle and comprising a frame including a pair of tubular members, means for mounting the frame on the rear portion of a bicycle, a one-piece seat member, and means for securing the seat member to the frame. The seat member includes means for partially enclosing the legs and feet of a seated child and for providing footholds therefor.

BRIEF DESCRIPTION OF A PREFERRED EMBODIMENT

Figure 1:
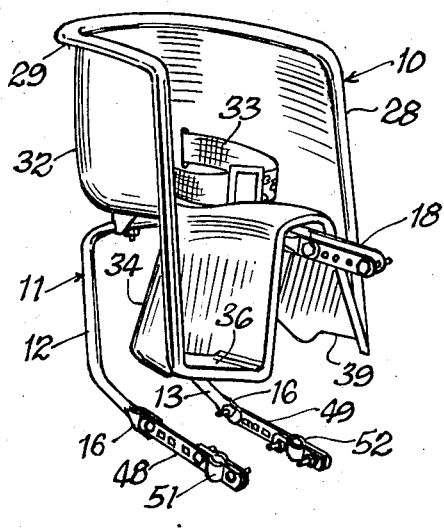
FIG. 1 is a front perspective view of a carrier in accordance with the present invention.

In the particular construction shown in the drawings, the numeral 10 indicates, generally, a rear carrier adapted for carrying a child on the rear portion of a bicycle in accordance with the present invention. The carrier includes a frame 11 principally comprising a pair of tubular members 12, 13. The ends of the tubular members 12, 13 are flattened to form bolt receiving lugs 14. 16. Carrier 10 includes means including a U-shaped bracket 18 for mounting frame 11 on a bicycle, indicated generally as 17 in the drawings. The pair of tubular members 12, 13 are attachable at lugs 14 to bracket 18 through the use of suitable fasteners, such as bolt 19 and nut 21. It is preferable to fasten lugs 14 to bracket 18 adjacent its central portion and to maintain the legs of bracket 18 in spacial relationship, for example, by installing a bushing 22 about bolt 19 and between the legs of bracket 18. Bracket 18 is mounted on seat post 23 of bicycle 17 by utilizing a clamp 24 mounted about seat post 23 or bracket 18 may be attached directly to saddle clamp 25 if desired. Bracket 18 is fastened to clamp 24 by suitable fastening means, such as bolt 26 and nut 27 as shown.

Figure 3:
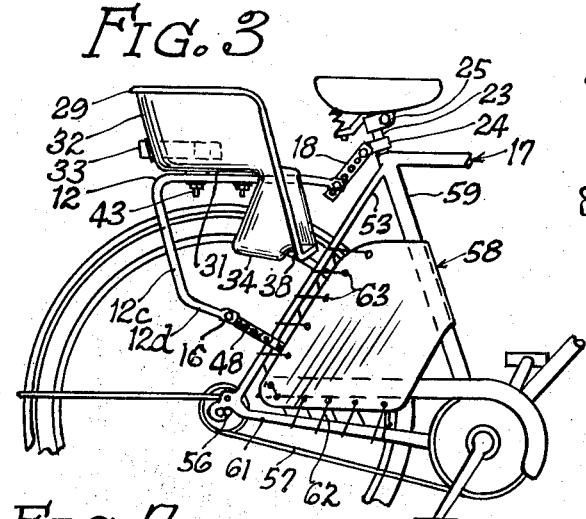
FIG. 3 is a side elevational view of the carrier shown in FIG. 2 in combination with one form of spoke guard mounted on the bicycle.
Figure 4:
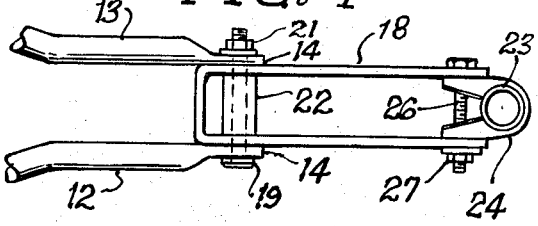
FIG. 4 is a fragmentary plan view, on an enlarged scale, illustrating the mounting of the frame members and bracket to a seat post of a bicycle in accordance with the present invention.

Bracket 18 is constructed with a plurality of bolt receiving apertures formed in alignment in its legs so as to provide a plurality of adjusted positions for mounting frame 11 to seat post 23. Thus as shown in FIG. 3, frame 11, and hence carrier 10, is adjustably mounted in a plurality of adjusted positions both horizontally and vertically with respect to seat post 23. As will be hereinafter described the other ends of tubular members 12, 13 are also attachable to bicycle 17 in a plurality of adjusted positions. It has been found that mounting carrier 10, and thus carrying the passenger therein, as close to seat post 23, and as low to the ground as the size of the passenger, rider, and bicycle 17 will permit, provides maximum stability of the combination of bicycle, rider, carrier and passenger for safe operation. However, the carrier must not be mounted so low or close to seat post 23 that the legs and feet of the passenger interfere with the pedaling and braking of the bicycle by the rider. By adjustment of the mounting of frame 11 and bracket 18, by adjusting the position of bolt 19 and/or the bolt of clamp 25, and of the other ends of members 12, 13, with respect to bicycle 17, carrier 10 can be mounted on bicycle 17 in the optimum adjusted position to support carrier 10 and passenger, within the limits described above, for maximum safety and stability.

The carrier further includes a one-piece molded seat member 28 preferably formed of impact-resistant resinous material such as high-impact polyethylene. Seat member 28 is formed with a outwardly formed rim 29 along its entire outer edge portion which further rigidizes seat member 28. Seat member 28 has a seat bottom 31 and a generally U-shaped back support 32 extending upwardly from three sides of the seat bottom 31, namely, from the back and sides of seat bottom 31 so as to partially enclose the lower torso portion of a seated child on three sides. Back support 32 may also support a seat belt 33, for example, by having seat belt 33 threaded through suitable apertures formed in back support 32, as shown. Seat member 28 further includes a leg portion 34 for partially enclosing the legs and feet of a seated child and for providing footholds therefor. Leg portion 34 is formed integrally with seat bottom 31 and back support 32 and extends downwardly from the forward edge of seat bottom 31. Leg portion 34 forms a saddle with seat bottom 31 which serves to maintain the child in carrier 10 and inhibits the forward movement of the child downwardly out of the carrier. Leg portion 34 extends forwardly and rearwardly of the forward edge of seat bottom 31. The two stirrup-shaped portions of leg portion 34 form heel-shaped wells 36, 37 which have a raised instep portion 38, 39 respectively, which provide footholds for the feet of the child seated in carrier 10. The wells 36, 37 of high-impact material serve to protect the legs and feet of the child from contact with various materials, such as, rocks, thrown by rear wheel 41 of bicycle 17 and further prevent the movement of the legs of the seated child rearwardly into contact with spokes 42 of rear wheel 41. Raised insteps 38, 39 normally engage the forward edge of the heel of the shoe or boot of the seated child inhibiting the forward movement of the feet and legs of the child out of wells 36, 37 toward engagement with wheel 41 and spokes 42. Even where a child is barefoot or is wearing heelless footwear, raised instep portions 38, 39 serve to retain the feet at an upward inclination inhibiting movement of the feet out of the wells. In this manner, the legs and feet of the seated child are substantially protected from movement out of carrier 10 and from contact with wheel 41 and spokes 42. In addition, safety straps (not shown) may be incorporated in wells 36, 37 to securely maintain the legs and feet of the seated child within the wells to prevent accidental removal therefrom.

Carrier 10 includes means for securing seat member 28 to frame 11. As shown in the drawings, such means may comprise bolts 43, threaded through apertures 44 formed in seat bottom 31 and corresponding apertures in tubular members 12, 13, the bolts being secured by nuts 46. The mounting of seat member 28 on frame 11 is facilitated by using carriage bolts for bolts 43 and forming cooperating square apertures as apertures 44 in seat bottom 31 and having reinforced bosses 47 formed on the underside of seat bottom 31 surrounding apertures 44. Bosses 47 are shaped to receive divergent portions 12a, 13a of tubular members 12, 13, respectively, which constitute a substantial length of the tubular members disposed beneath seat bottom 31. Tubular members 12, 13 have parallel portions 12b, 13b, respectively, which extend for an initial distance from the forward edge of seat bottom 31 beginning with their junction with lugs 14. The parallel portions 12b, 13b, like the divergent portions 12a, 13a are disposed beneath seat bottom 31. The means for securing seat member 28 to frame 11 may include lock washers (not shown) disposed about the shafts of bolts 43 between tubular members 12, 13 and nuts 46. Securing of seat member 28 to frame 11 in this manner provides a rigid, sturdy construction which affords improved balance to the combination of carrier 10 and bicycle 17.

The preferred embodiment shown in the drawings further includes apparatus for attaching the ends of tubular members 12, 13 opposite lugs 14 to the rear portion of bicycle 17. Tubular frames 12, 13 have members 12c, 13c depending from the ends of diverging portions 12a, 12b respectively, which have angularly bent converging terminal portions 12d, 13d, respectively, terminating in lugs 16 heretofore described. Preferably, the various portions, members and lugs of each of tubular members 12, 13 are integrally formed of a high strength material, such as a steel tube. A pair of links 48, 49 are bolted at one of their aligned apertures to each of the pair of lugs 16 by bolts, lugs and lock washers. Each of links 48, 49 are fitted with clamping members 51, 52, respectively, about the struts 53, 54 on each side of bicycle 17 running generally between rear axle 56 and seat post 24. Clamping members 51, 52 are secured to links 48, 49, respectively, by a pair of mating bolts, nuts and lock washers as shown. In this manner, the lower portion of frame 11 is secured to struts 53, 54 of bicycle 17 in one of a plurality of adjusted positions to provide a rigid support for carrier 10. Therefore, carrier 10 can be mounted on bicycle 17 and dismounted therefrom without removal of axle nut 56 from the axle of bicycle 17. Mounting of carrier 10 as described above eliminates misalignment of wheel 41 and the rear axle relative to the frame of bicycle 17 and incorrect tensioning of chain 57 which often occurs upon loosening or removal of axle nut 56 to install accessories on the rear portion of a bicycle.

Links 48, 49 and clamping members 51, 52 are adjustable along struts 53, 54 to selectively position carrier 10 vertically and horizontally on bicycle 17. In addition, links 48, 49 are pivotably mounted to tubular members 12, 13, respectively, to compensate for the variation in the positioning of struts 53, 54 in the different sizes and types of bicycles of various manufacturers. Adjustment of links 48, 49 and clamping members 51, 52 along struts 53, 54, selection of aligned apertures of the links for mounting tubular members 12, 13 to links 48, 49, as well as adjustment of the mounting of bracket 18, provides for the mounting of carrier 10 on a bicycle to achieve maximum stability and safety in the operation of the bicycle with a particular rider and passenger, as heretofore described.

A further embodiment of the present invention provides a carrier having further means for preventing the feet of a child carried thereby from contacting wheel 41 and spokes 42 of bicycle 17. In this embodiment, the further means can be provided by a foot guard as shown in FIG. 3. In this FIGURE, a U-shaped foot guard 58 is provided which is draped about strut 59 of bicycle 17 which supports seat post 23. Foot guard 58 is fastened to struts 53, 54 and the generally horizontal struts 61 which connect with struts 53, 54 to support the rear axle. The fastening can be accomplished, for example, by simply lacing at least one pair of the marginal edges of foot guard 58 to the struts by using lacing 62 threaded through apertures 63 formed in the marginal portions of the superposed leg portions of foot guard 58 and about the struts. Foot guard 58 may be formed of relatively thin and stiff, resiliently deformable, resinous material such as polyethylene. As shown in FIG. 3, foot guard 58 in combination with the seat member 28 and frame 11 provide the desirable advantages heretofore described for carrier 10 for safely carrying children of various ages from infancy to adolescence.

Figure 2:
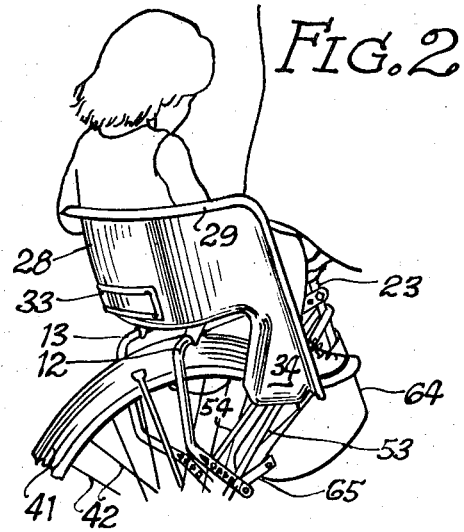
FIG. 2 is a rear perspective view of the carrier shown in FIG. 1 showing the carrier mounted on the rear portion of a bicycle with a rider seated on the bicycle seat and with a child being carried in the carrier.
Figure 5:
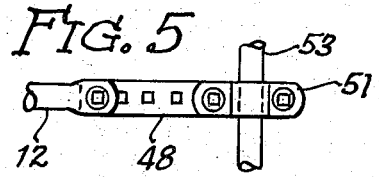
FIG. 5 is a fragmentary plan view, on an enlarged scale, showing the mounting of a frame member on a strut of a bicycle in accordance with the invention.
Figure 6:
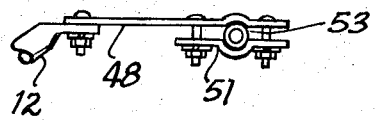
FIG. 6 is a top plan view of the apparatus shown in FIG. 5.
Figure 7:
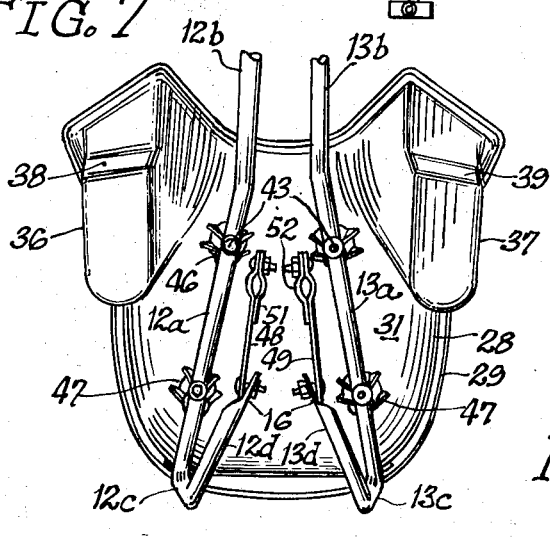
FIG. 7 is a fragmentary bottom view of the carrier shown in FIG. 1.
Figure 8:
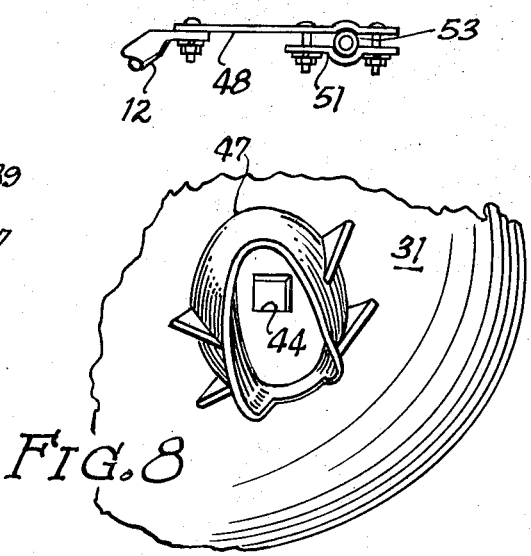
FIG. 8 is a fragmentary bottom view, on an enlarged scale, of the seat bottom of the carrier of FIG. 7.
Figure 9:
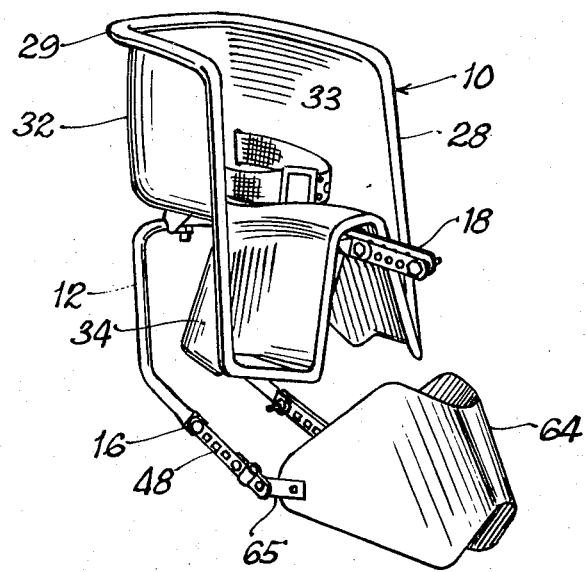
FIG. 9 is a front perspective view of a carrier in accordance with another embodiment of the present invention.
Figure 10:
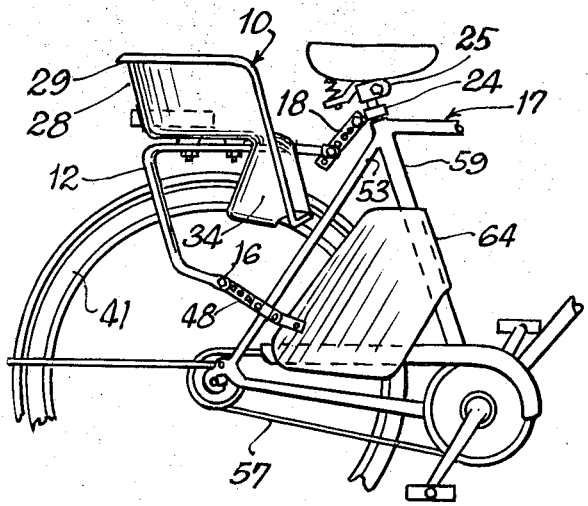
FIG. 10 is a side elevational view of the carrier shown in FIG. 9 mounted on the rear portion of a bicycle.

Still another embodiment of the present invention is illustrated in FIGS. 2, 9 and 10 wherein a foot guard 64 is mounted to bicycle 17 and links 48, 49 extending from tubular members 12, 13, respectively. Foot guard 64 can be formed of the same material as foot guard 58 and is similarly draped about strut 59 of bicycle 17. Foot guard 64 is mounted to links, 48, 49 and their respective clamping members 51, 52 by means of a pair of straps 65, each extending from one side portion of foot guard 64, for example, from a suitable slot aperture formed therein, as shown, the straps 65 being held to the links and clamping members by one of the bolts passing therethrough as shown in detail in FIGS. 5 and 6. As illustrated in FIG. 10, the combination of foot guard 64, seat member 28 and frame 11 provide a combination for safely carrying a child on the rear portion of a bicycle irrespective of the size of the child as long as his legs, when extended, do not extent below the bottom edge of foot guard 64.

Various changes coming within the spirit of our invention may suggest themselves to those skilled in the art; hence, we do not wish to be limited to the specific embodiments shown and described and uses mentioned, but intended the same to be merely exemplary, the scope of our invention being limited only by the appended claims.

We claim:

1. A carrier adapted for carrying a child on a bicycle having a seat post and at least one strut, comprising
   a. a frame including a pair of tubular members,
   b. means for mounting said frame on the rear portion of a bicycle in a plurality of adjusted positions with respect thereto including a bracket adapted for mounting on a bicycle seat post, said pair of tubular members being attachable at one end to said bracket in a plurality of adjusted positions in relation to the bicycle seat post, and said pair of tubular members being attachable at their other ends to at least one strut of a bicycle in a plurality of adjusted positions in relation to said strut,
   c. a one piece seat member having means for partially enclosing the legs and feet of a seated child and for providing footholds therefor, and
   d. means for securing said seat member to said frame.

2. The carrier defined in claim 1 wherein said pair of tubular members are disposed beneath said seat member, said pair of tubular members being substantially parallel adjacent their said one end and are divergent for a substantial portion of their length disposed beneath said seat member.

3. The carrier defined in claim 2 wherein the divergent terminal portions of said pair of tubular members have depending members having angularly bent converging terminal portions adjustably securable in a plurality of adjustable positions to a pair of struts of a bicycle frame.

4. A carrier adapted for carrying a child on a bicycle comprising
   a. a frame including a pair of tubular members
   b. means for mounting said frame on the rear portion of a bicycle in a plurality of adjusted positions with respect thereto,
   c. a one-piece seat member having a seat bottom and a generally U-shaped back support portion extending upwardly from three sides of said seat bottom so as to enclose the lower torso portion of a seated child on three sides, said seat member having means for partially enclosing the legs and feet of a seated child being formed integrally with said back support portion and extending forwardly and rearwardly of the forward edge of said seat bottom and including a heel shaped well and a raised instep portion so as to at least partially enclose the feet of a seated child and for providing footholds therefor, said means for partially enclosing the legs and feet of a child forming a saddle with said seat bottom, and
   d. means for securing said seat member to said frame.

5. A carrier adapted for carrying a child on a bicycle comprising
   a. a frame including a pair of tubular members,
   b. means for mounting said frame on the rear portion of a bicycle in a plurality of adjusted positions with respect thereto,
   c. a one-piece seat member having means for partially enclosing the legs and feet of a seated child and for providing footholds therefor, and
   d. means for securing said seat member to said frame, wherein said means for mounting said frame includes a U-shaped bracket adapted for mounting adjacent its terminal ends on a bicycle seat post, said pair of tubular members being attachable to the legs of said bracket in a plurality of adjusted positions spaced from its central portion, said seat member having a seat bottom and generally U-shaped back support portion extending uwpardly from three sides of said seat bottom so as to enclose the lower torso portion of a seated child on three sides, said pair of tubular members being disposed beneath said seat bottom and being substantially parallel adjacent their said one end and divergent for a substantial portion of their length disposed beneath said seat bottom, said pair of tubular members having depending members extending from their divergent terminal portions, said depending members having angularly bent converging terminal portions adjustable securable to a pair of struts of a bicycle frame in a plurality of adjusted positions with respect thereto, said means for partly enclosing the legs and feet of a seated child and for providing footholds therefor extending downwardly from said seat bottom and forming a saddle with said seat bottom, said means being formed integrally with said seat bottom and extending forwardly and rearwardly of the forward edge of said seat bottom, and said means including a heel shaped well and a raised instep portion so as to at least partially enclose the foot of a seated child.

6. In combination with a vehicle having a rear wheel and a tubular first frame, a carrier adapted for carrying a child on said vehicle comprising a second frame including a pair of tubular members, means for mounting said second frame on the rear portion of said vehicle in a plurality of adjusted positions with respect thereto, a one-piece seat member having means for partially enclosing the legs and feet of a seated child and for providing footholds therefor, means for securing said seat member to said second frame, a foot guard formed of stiff and resiliently deformable material at least partially covering said rear wheel, and means for attaching said foot guard to said first frame, a U-shaped foot guard formed of stiff and resiliently deformable material and having two superposed leg portions adapted to be draped about a portion of said first frame and a portion of the periphery and sides of the rear wheel with said guard at least partially covering said rear wheel, and means for attaching said foot guard to said frame.

7. The combination as defined in claim 6 wherein said means for attaching said foot guard comprises lacing, said foot guard being formed with apertures along at least one pair of its marginal portions, whereby said lacing can be threaded about at least a pair of tubular members of said first frame and through said apertures formed in said foot guard to attach said foot guard to said first frame.

8. The combination as defined in claim 6 wherein said means for attaching said foot guard comprises a pair of strap members, each attachable to one leg portion of said foot guard and to one of the pair of tubular members of said second frame, whereby said foot guard is attachable to said first frame and said second frame upon draping the leg portions of said foot guard about one tubular member of said first frame.

9. A carrier adapted for carry a child on a bicycle having a seat post and at least one strut, comprising
   a. a frame including a pair of tubular members,
   b. means for mounting said frame on a bicycle including a U-shaped bracket adapted for mounting adjacent its terminal ends on the bicycle seat post, said pair of tubular members being attachable to the legs of said bracket in a plurality of adjusted positions spaced from its central portion,
   c. a one-piece seat member having means for partially enclosing the legs and feet of a seated child and for providing footholds therefor, said pair of tubular members being disposed beneath said seat bottom and being substantially parallel adjacent their said one end and divergent for a substantial portion of their length disposed beneath said seat bottom, said pair of tubular members having depending members extending from their divergent terminal portions, said depending members having angularly bent converging terminal portions adjustably securable to at least the strut of the bicycle in a plurality of adjusted positions with respect thereto, and
   d. means for securing said seat member to said frame.

* * * * *

/ PO-1050
(5/69)

UNITED STATES PATENT OFFICE
CERTIFICATE OF CORRECTION

Patent No. 3,802,598           Dated April 9, 1974

Inventor(s) Irvin E. Berger, John Peter Ronvik, Kenneth F. Welter

It is certified that error appears in the above-identified patent and that said Letters Patent are hereby corrected as shown below:

On the heading page, the name of the inventor and his residence is misspelled. The correct name is IRVIN E. BERGER and correct residence is SKOKIE.

IN THE SPECIFICATION:

Column 3, lines 18 and 19, "rigidizes" should read --rigidifies--

IN THE CLAIMS:

Column 6, line 67, "adjustable" should read --adjustably--

Signed and sealed this 17th day of September 1974.

(SEAL)
Attest:

McCOY M. GIBSON JR.
Attesting Officer

C. MARSHALL DANN
Commissioner of Patents

FO-1050
(5/69)

UNITED STATES PATENT OFFICE
CERTIFICATE OF CORRECTION

Patent No. 3,802,598          Dated April 19, 1974

Inventor(s) Irvin E. Berger, John Peter Ronvik, Kenneth F. Welter

It is certified that error appears in the above-identified patent and that said Letters Patent are hereby corrected as shown below:

IN THE CLAIMS:

Column 7, lines 21-24, delete: "a foot guard formed of stiff and resiliently deformable material at least partially covering said rear wheel, and means for attaching said foot guard to said first frame,"

Column 7, line 30, after "foot guard to said" insert --first--.

Signed and Sealed this

Tenth Day of August 1976

[SEAL]

Attest:

RUTH C. MASON
Attesting Officer

C. MARSHALL DANN
Commissioner of Patents and Trademarks